March 24, 1936.    A. E. BYLER    2,034,894
THERMOSTATIC CONTROL SYSTEM
Filed May 10, 1933    4 Sheets-Sheet 1
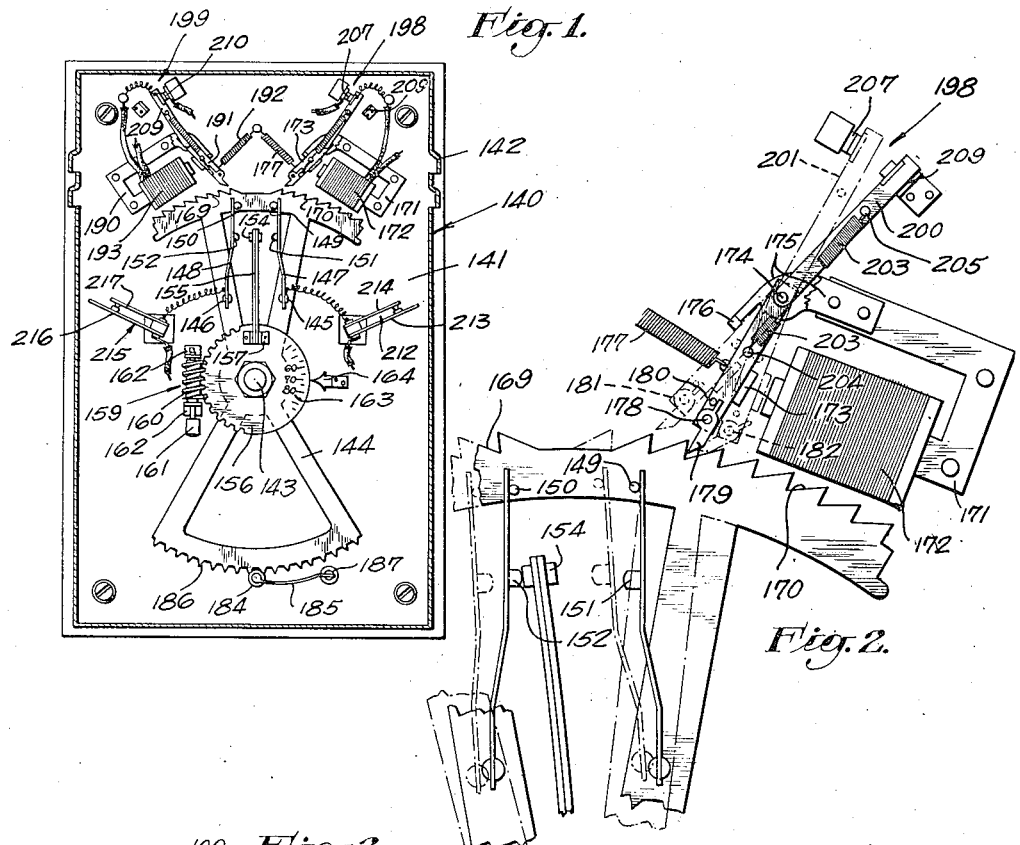
Fig. 1.
Fig. 2.
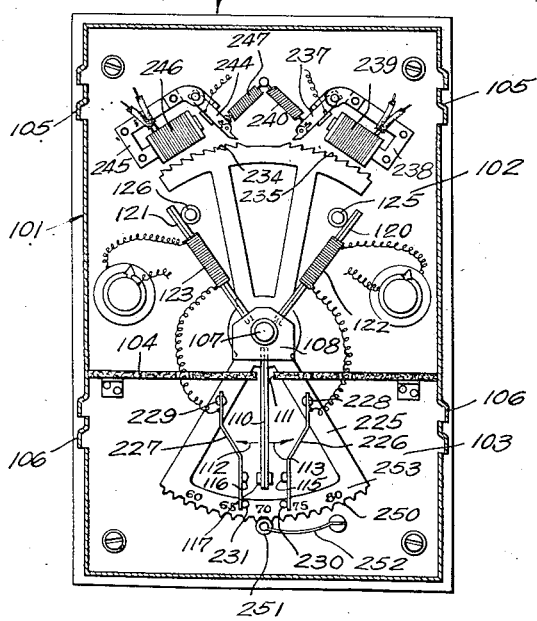
Fig. 3.
INVENTOR:
ALBERT E. BYLER,
By
ATTORNEY.

March 24, 1936.  A. E. BYLER  2,034,894
THERMOSTATIC CONTROL SYSTEM
Filed May 10, 1933  4 Sheets—Sheet 2
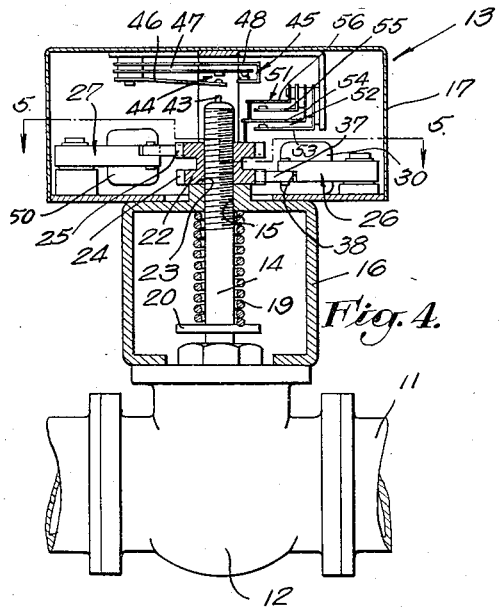
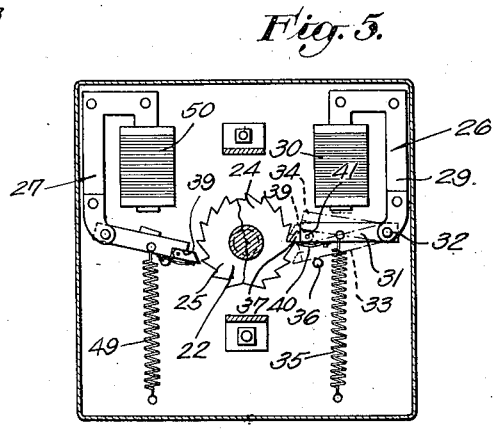
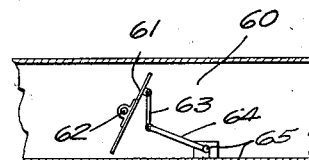
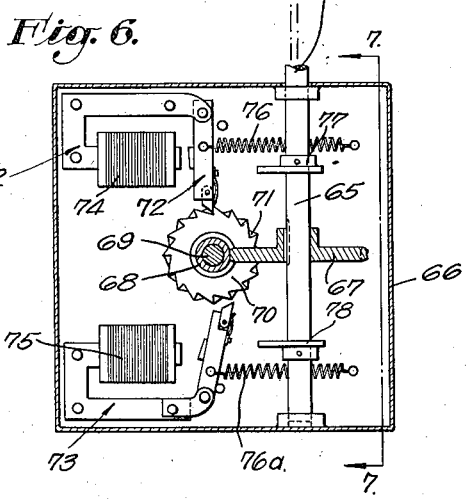
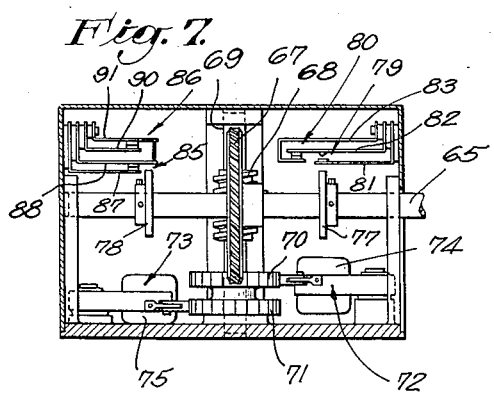
INVENTOR:
ALBERT. E. BYLER,
By
ATTORNEY March 24, 1936.     A. E. BYLER     2,034,894
THERMOSTATIC CONTROL SYSTEM
Filed May 10, 1933     4 Sheets-Sheet 3

INVENTOR:
ALBERT E. BYLER,
By Ford W. Lavin
ATTORNEY.

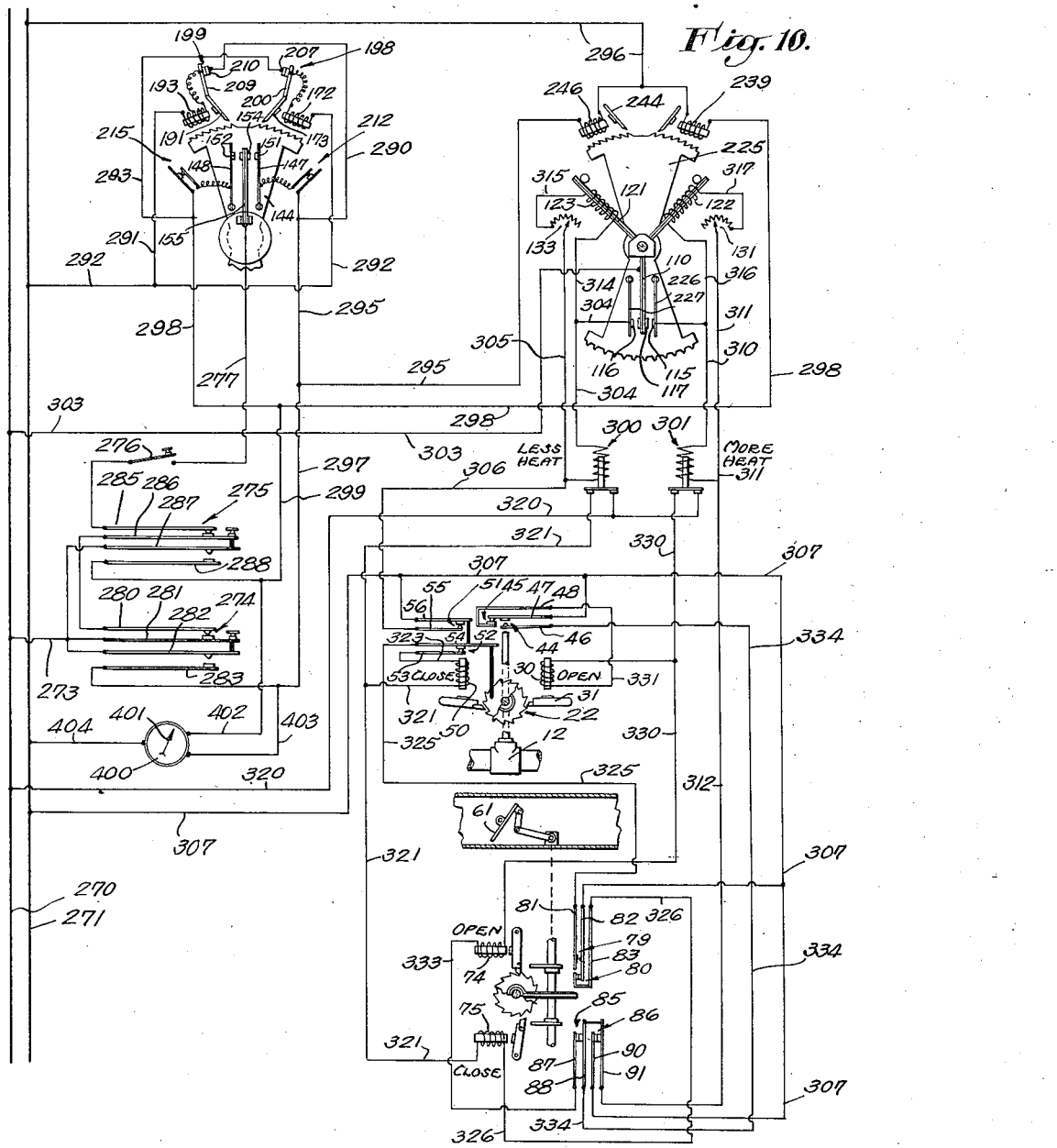

Patented Mar. 24, 1936

2,034,894

UNITED STATES PATENT OFFICE 2,034,894

THERMOSTATIC CONTROL SYSTEM

Albert E. Byler, Los Angeles, Calif.

Application May 10, 1933, Serial No. 670,271

25 Claims. (Cl. 236—1)

My invention relates to a control system for controlling the physical conditions of a medium. It finds particular utility in air conditioning or temperature-control systems, and while one embodiment will be specifically described in reference to such systems it should be understood that this type of installation has been chosen only because it best illustrates the fundamental features involved in the invention, and because of the particularly important application of the invention to this field.

In controlling the temperature conditions of a room, for instance, it is conventional practice to provide a control means capable of changing the temperature in this room by throttle action on the flow of heat, and to control this means by a thermostat. One method of accomplishing this end is to operatively connect the control means and the thermostat through the medium of a column of liquid or gas, or by other more direct connection. A second method is to electrically connect the thermostat and the control means. Most electrically operated systems utilize a control means which assumes only two positions, either a totally closed position and an open position or two intermediate positions. Such a system is not adapted to accurate control, for the system invariably "over-shoots", thus resulting in "hunting" or a repeated raising and lowering of the temperature above and below the required value.

It is an object of the present invention to provide a novel means of operatively connecting a thermostatic means and a control means capable of changing the conditions of a medium, which system is both inexpensive and effective.

These results I accomplish by the use of a step-by-step system operating such a control means, and it is another object of the present invention to provide a system operatively connecting a thermostatic means and a control means capable of changing the physical conditions of a medium. Such a thermostatic means may be responsive to wet-bulb or dry-bulb temperatures or may be responsive to both as will be hereinafter pointed out.

It is a further object of the invention to provide a control means operating step-by-step in response to electric impulses delivered thereto and to provide a thermostatic means for controlling the impulses delivered to said control means.

It is another object of the invention to provide a system wherein, for the sake of compactness, the impulses are set up by the operation of the thermostatic means, but it should be understood that the essential features of the invention are independent of the source of the impulses.

Another object of the invention is to incorporate in a step-by-step control system a thermostatic means providing a pair of contacts which come into engagement when the thermostatic means calls for a change in conditions, and to provide a device for shortly thereafter separating these contacts after the control means has been advanced one way or the other, thus, in the interest of compactness and simplicity, utilizing the one pair of contacts for both impulse generation and also impulse delivery to the control means.

In one form of the invention this separation of the contacts is made to take place through the action of a secondary heat-responsive element controlled by the current passing through the contacts when closed. The provision of such a thermostatic means including a secondary or auxiliary heat-responsive means is another object of the invention.

It is sometimes preferable to use two control means, one coming into operation only after the other has reached a given position. My invention provides for such a system and preferably utilizes two or more control means, operable in completely reversible sequence, each one coming into operation only after the previous ones in sequence have assumed their maximum positions, the sequence being completely reversible from any desired point. My invention provides for such operation.

Still a further object and advantage of my system lies in its desirable operation of automatically moving the control means into maximum position when the heat supply source is shut down, as, for instance, if the heating or cooling source of a building is turned off for the night. My system thus permits a maximum rate of change of the physical conditions when the heating or cooling source is again put in operation.

A further object of the invention is to provide a system wherein no current will flow except when a change of conditions is desired and is also obtainable. Thus, when the heating or cooling plant is shut down, the control means assumes its maximum position after which no current will flow in any part of my system until the heating or cooling plant is again put in operation.

A further object and advantage of my system lies in its desirable operation to continually actuate the control means in response to a call for changed conditions by the thermostat, such actuation being independent of the amount of heat, for instance, available at the control means. Thus, if the heating plant of a building is operating at reduced capacity a greater opening of the control means is required to maintain required room conditions than when the heating plant is operating at full capacity. My system takes care of this situation automatically.

It is often desirable to change the physical conditions in one location in response to changes in another location. Thus, in the heating of buildings it is recognized that during warm weather the temperature in the building should be maintained at a temperature related to the outside temperature. It is an object of the present invention to provide two thermostatic means operatively connected to change the setting of one as the conditions affecting the other are changed.

A further object of the invention is to make provision whereby the rate of occurrence or frequency of the impulses delivered to the control means, and, therefore, the rate of actuation of the control means, may be easily adjustable, and further to make provision whereby the rate of actuation of the control means toward one extreme can be set for a value different from the rate of actuation of the control means toward the other extreme.

Further objects of the invention lie in the novel structure of the elements involved regardless of whether a step-by-step system is used. Thus, the thermostatic means of the invention is novel irrespective of the particular control system utilized, it being an object of this invention to provide a heat-responsive element including contacts which come into engagement in response to temperature conditions, and which are subsequently moved from engagement by auxiliary means, this auxiliary means being either a mechanical means, such as a dash-pot or linkage, or an electrical means, such as an actuating means for shifting the position of at least one of the contacts, or a thermal means wherein the contacts are separated through thermal action.

Other objects of the invention lie in the details of construction of the actuating means for the step-by-step control means.

Still further objects and advantages of the invention will be made apparent to those skilled in the art from the following description.

Referring to the drawings in which I have illustrated one form of the invention in relatively complete detail for the purpose of definiteness, Fig. 1 is a view, partly in section, of the master thermostat of my invention.

Fig. 2 is an enlarged detailed view of a portion of the master thermostat illustrated in Fig. 1.

Fig. 3 is a view, partly in section, of the control thermostat of my invention.

Fig. 4 illustrates one type of control means capable of changing the physical conditions of the medium.

Fig. 5 is a sectional view taken on the line 5—5 of Fig. 4.

Fig. 6 illustrates another type of control means.

Fig. 7 is a sectional view taken on the line 7—7 of Fig. 6.

Fig. 10 is a complete wiring diagram of the preferred embodiment of the invention.

Figure 9:
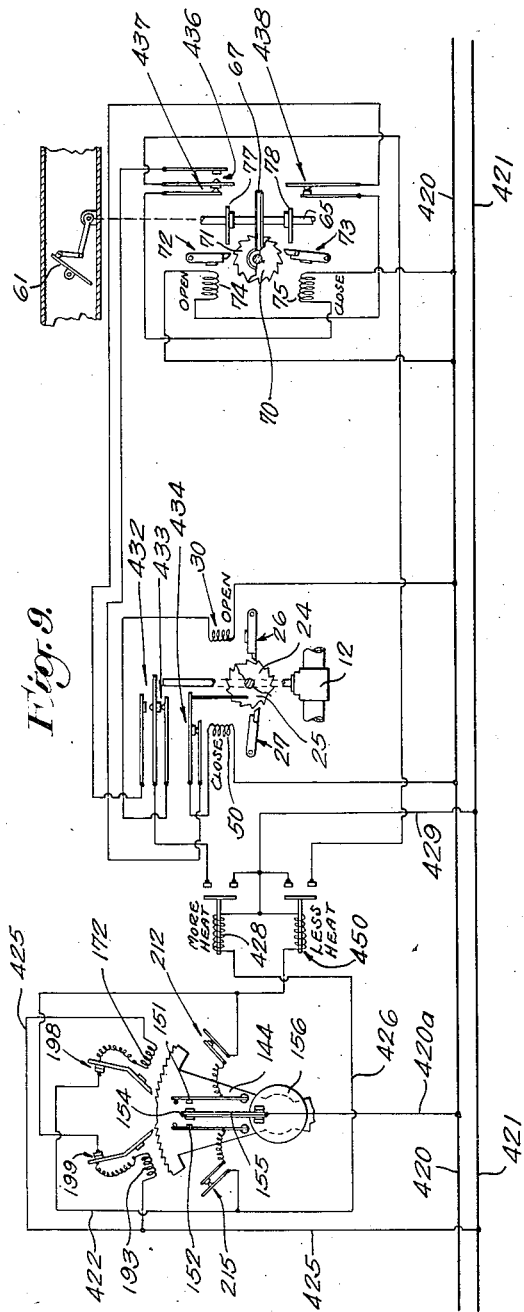
Fig. 9 is a simplified wiring diagram illustrating the direct connection of the master thermostat to the control means as an alternative system.

The invention can best be understood by first considering the function of the control means, and structures which perform this function in a desirable manner. Two types of such control means are illustrated in Figs. 4 to 7, inclusive. The function of such a control means is to change the physical conditions of a medium, such as air, and, in the preferred embodiment I have illustrated a system for controlling the temperature of the air in a room.

Referring particularly to Fig. 4 I have illustrated a structure for controlling the flow of a heating or cooling medium through a pipe 11, this pipe communicating with a heating or cooling means not shown and acting either directly or indirectly to control the temperature of the room. For instance, this pipe may be used to supply steam to a blast heater positioned in the ventilating passage communicating with the room, air being forced through this passage by any suitable means well known in the art. The pipe 11 includes a valve 12 which is controlled by an electrically actuated means of the step-by-step type and hereinafter termed a step-by-step structure 13. One of the features of the present invention is that this step-by-step structure is advanced or retracted by electric impulses supplied thereto in response to any desired change of temperature in a manner which will be hereinafter described in detail.

The type of valve 12 illustrated is opened and closed by movement of a plunger 14 provided with a threaded portion extending through an opening 15 of a frame 16 supported by the valve. This threaded portion extends into a control box 17 which surrounds the operating mechanism and which may be suitably attached to the frame 16. A spring may be used to resiliently force the plunger 14 in a direction to either close or open the valve, preferably the former. This spring is indicated by the numeral 19 and is compressed between the frame 16 and a collar 20 carried by the plunger 14. In some instances it is possible to dispense with such a spring, allowing the gravitational force acting on the plunger to close or open the valve.

Threaded to the plunger is a nut 22 normally engaging a face 23 of the frame 16 and adapted, when rotated, to raise or lower the plunger, thus opening the valve 12 in varying degrees. In the embodiment shown, the nut 22 provides two ratchets 24 and 25 with teeth pointed in opposite directions. Actuating means 26 and 27 are respectively provided for engagement with these ratchets, these actuating means being electrically actuated in response to the incoming impulses and cooperating with the ratchets 24 and 25 to define ratchet means for advancing and retracting the plunger 14, thus opening and closing the valve 12 in varying degrees.

The actuating means 26 is best shown in Fig. 5 and includes a core 29 of magnetic material and surrounded by a winding 30 which, when energized, magnetizes the core and attracts an armature 31 pivoted on a pin 32, moving this armature from its dotted line position 33 through its full line position and into its dotted line position 34 in which the armature contacts the core or other stop means. This movement of the armature can be utilized for turning the nut 22, but in the preferred embodiment I prefer to utilize the return movement thereof in accomplishing this end, this return movement taking place when the winding 30 is deenergized. In accomplishing this result I provide a spring 35 acting to return the armature to its dotted line position 33 where it rests against a stop 36, this spring being under sufficient tension to move the nut 22. The actual interconnection between the armature and the ratchet 24 is effected through a spring-actuated pawl 37 fitting in a depression 38 of the armature and held in engagement with a wall 39 of the depression by a spring 40. The pawl is pivoted to the armature by a pin 41, and is so designed as to slip over the teeth of the ratchet 24 when the armature 31 moves into its dotted-line position 34, but engaging these teeth to advance the ratchet 24 one notch when returning to its dotted line position 33, the pawl engaging the wall 39 during this advancement of the ratchet. This pawl clears the teeth when the armature 31 is in the dotted-line position 33. Thus, each impulse delivered to the winding 30 will advance the ratchet 24 one step, thus drawing upward on the plunger 14 and opening the valve 12 slightly more.

When the valve 12 assumes a desired maximum open position, a pin 43 carried by the upper end of the plunger 14 acts to first close a limit switch 44 and immediately open a limit switch 45. As shown in Fig. 4, these switches may be formed by using a spring contact 46 moved upward by the pin 43 into engagement with a spring contact 47, thus moving the contact 47 to break circuit with a U-shaped contact arm 48, in a well known manner.

The valve 12 is closed step-by-step by the actuating means 27 which is identical with the actuating means 26 except that it is reversed in position so that the pawl carried thereby rotates the nut 22 in an opposite direction to lower the plunger 14 and partially close the valve. The teeth on the ratchet 24 are formed to permit the pawl to slip thereover when the armature is being attracted and to engage therewith when the armature is being returned under the action of a spring 49. A winding 50 magnetizes the core and attracts this armature in a manner previously described.

It will thus be clear that each time an electric impulse is delivered to the winding 50, the nut 22 will be turned a step to allow the plunger to move downward, thus closing the valve 12 step-by-step. When the valve is completely closed any subsequent energization of the winding 50 will cause the nut 22 to move upward on the plunger 14 away from the face 23. This upward movement of the nut is utilized to open limit switches 51 and 52 either simultaneously or in quick succession. The limit switch 52 may conveniently be formed of spring contacts 53 and 54 normally in contact, while the limit switch 51 may be formed of spring contacts 55 and 56 also normally in contact with each other. The spring contact 54 carries an insulated strip extending downward to engage the nut 22 as it moves upward, while the spring contact 56 carries an insulated strip extending downward to engage the contact 54, as shown, or to engage the nut 22 itself. The limit switches 51 and 52 are so positioned that the nut 22 will open these switches before this nut moves the operating zone of the pawls on the respective actuating means 26 and 27, and before the ratchet 24 can contact the pawl of the actuating means 27. This latter result may be accomplished by vertically spacing the ratchets 24 and 25 as shown.

One very important advantage accruing from a structure in which the impulses merely move an armature against a spring, allowing the spring to subsequently move the plunger 14, is that so long as a sufficient electric impulse is received to attract the armature, the spring itself will take care of the advancement of the plunger 14 when the impulse ceases. This has a dual advantage. In the first place, it insures that the force tending to move the plunger will be constant, regardless of variations in potential of the electric impulses, thus insuring movement by a positive and complete step. A partial step might cause the mechanism to lock against a following impulse in the opposite direction. More important, however, it is often desirable to connect the limit switches to the impulse-delivering circuits, in which event it is clear that any electric impulse sufficient to attract the armature will result in a further movement of the limit switches when the spring advances the nut 22 or the plunger 14. This insures a positive action of the limit switches after the last impulse sufficient to actuate the actuating means 26 or 27 has been received, and insures complete opening or closing of these limit switches.

Another form of control means is illustrated in Figs. 6 and 7 and is adapted to directly control the flow of a hot or a cool gas through a duct 60 as controlled by the position of a damper 61. This damper is shown as being pivoted at 62 and connected by a link 63 to an arm 64 carried by a pivoted shaft 65 in a well known manner. Other means of connection may, however, be used. This form of control means is equally well adapted to the control of heat by many other methods. For instance, it may actuate a rheostat to control the output of an electric radiator, or to control the speed of a fan or a pump. The shaft 65 is suitably journalled in a control box 66 and carries a worm gear 67 meshing with a worm 68. A shaft 69 carries the worm 68 and is turned step-by-step through the action of two ratchets 70 and 71 with corresponding actuating means 72 and 73 similar to those previously described. Windings 74 and 75 respectively control these actuating means 72 and 73, and retract their respective armatures against the action of springs 76 and 76a. Thus, successive impulses delivered to these windings will respectively open and close the damper 61 step-by-step.

Limit switches, best shown in Fig. 7, are provided in this form of the invention and these switches may be conveniently actuated by cams 77 and 78 carried by the pivoted shaft 65 or equivalent means. As shown, one set of switches includes limit switches 79 and 80 being operated by the cam 77 and respectively closing and opening in succession when the desired closed position of the damper 61 is reached. Structurally, these switches 79 and 80 may be formed of a spring contact 81 engaged by the cam 77 to be moved into engagement with a spring contact 82 to close the limit switch 79. This spring contact 82 is then moved from engagement with a U-shaped spring contact 83 to break contact therewith, thus opening the limit switch 80. Another set of limit switches are actuated by the cam 78 and have been designated as limit switches 85 and 86 adapted to simultaneously or successively open when the desired open position of the damper 61 has been reached. Structurally, these limit switches may comprise spring contacts 87 and 88 normally in engagement, the spring contact 88 being engaged by the cam 78 when the desired open position of the damper has been reached, thus opening the limit switch 85. Spring contacts 90 and 91 may form the limit switch 86, being normally in engagement, the spring contacts 91 and 88 being operatively connected together by an insulating member, as shown, so that the cam 78 opens both the switches 85 and 86 when the desired limit has been reached.

Coming now to a description of the impulse-control system, typical apparatus is illustrated in Figs. 1 to 3 and includes a thermostatic means for controlling these electric impulses. Two systems are possible. Either the thermostatic means may itself generate the impulses, or it may control the delivery to the step-by-step actuating means of impulses otherwise formed, as, for instance, by a suitable make-and-break system continuously delivering to the thermostatic means electric impulses at predetermined constant intervals of time, the thermostatic means delivering these impulses to the step-by-step actuating means to change the temperature or other conditions in the room as called for by the thermostatic means. The former system is the preferred one for reasons hereinbefore stated and because the impulses are only generated in response to the conditions of temperature, etc., which it is desired to change.

One system of thus setting up electric impulses as a function of the temperature in the room is shown in Fig. 3 illustrating a control thermostat 100. This construction includes an enclosing structure 101 preferably in the form of a metal box with hinged cover. The interior of this enclosing structure is divided into upper and lower compartments 102 and 103 by an intermediate wall 104 of suitable thermal insulating properties. Louvers 105 and 106 respectively circulate air through these compartments so as to maintain the temperature therein as nearly as possible the same as the temperature in the room.

A shaft 107 is mounted to extend forwardly in the upper compartment, being secured to the rear wall of the enclosing structure. Pivotally mounted on the forward end of this shaft is a block 108 preferably formed of thermal and electrical insulating material. This block carries a bimetallic heat-responsive element 110 extending downward through an opening 111 of the intermediate wall 104 so as to be responsive to the temperature in the lower compartment 103 and thus equally responsive to the temperature of the surrounding air. Thus, considering the block 108 as being held stationary, the lower end of the heat-responsive element will move leftward or clockwise as indicated by the arrow 112 when the temperature increases, and will move rightward or anti-clockwise as indicated by the arrow 113 when the temperature decreases. This movement I utilize for the purpose of controlling the step-by-step control means, this being accomplished by contact means which will now be described.

Such a contact means includes primary and secondary contacts 115 and 116 positioned on opposite sides of the heat-responsive element 110 and respectively contacted by a movable contact means 117 when the heat-responsive element calls for more or less heat. These contacts 115 and 116 may be respectively connected in circuit with the two windings 74 and 75 of the control means illustrated in Figs. 6 and 7, for instance. Thus, when the movable contact means 117 engages the contact 115 the winding 74 is energized to attract the armature against the action of the spring 76, the specific mode of connection being discussed more in detail hereinafter. In order that this circuit be broken to complete the impulse which will open the damper a step, two possibilities are present. Either the heat-responsive element 110 may be moved to a neutral position intermediate the contacts 115 and 116, thus interrupting the circuit to form the impulse, or the contacts 115 and 116 may be individually or collectively moved from the contact means 117 of the heat-responsive element. Both systems fall within the scope of the present invention.

Referring to the first system, wherein the heat-responsive element 110 is moved to a neutral position to break the circuit and complete the impulse, this movement of the element 110 can be accomplished by mechanical, thermal, or electrical means or by a combination thereof. In the preferred embodiment, I utilize auxiliary heat-responsive elements 120 and 121 for this purpose, these elements being respectively heated by heaters 122 and 123 which may include resistance wire wound therearound but electrically insulated therefrom. The inner ends of these auxiliary heat-responsive elements are secured to the block 108, the outer ends extending outward and bearing against pins 125 and 126 extending forward from the rear wall of the enclosing structure 101. Individual heating of these heaters will have a tendency to move the outer ends of the auxiliary heat-responsive elements. This being prevented by the pins 125 and 126, the reaction pivots the block 108 slightly to separate the contact means 117 from the contact previously engaged thereby, as will be more fully pointed out hereinafter.

Figure 8:
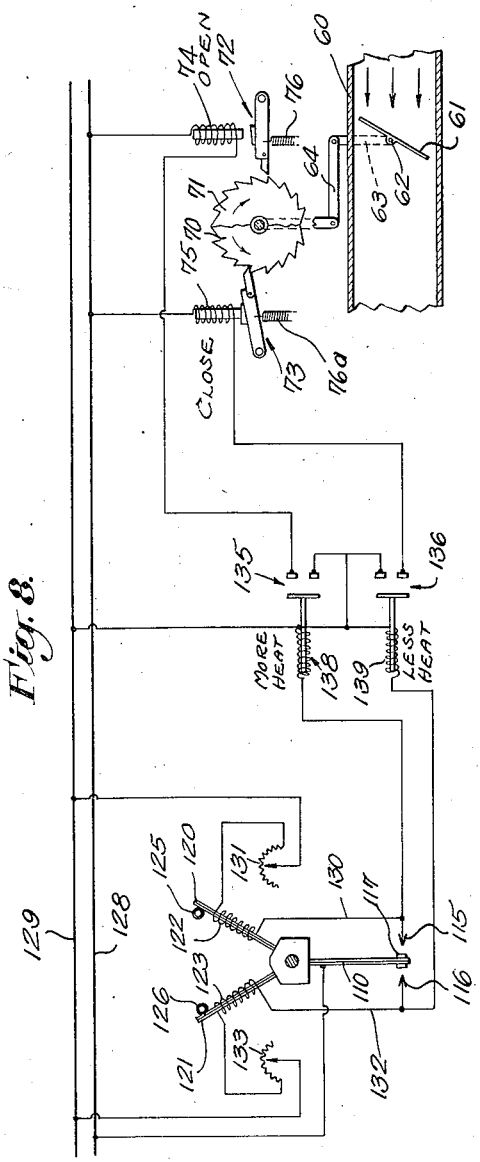
Fig. 8 is a simplified wiring diagram illustrating the connection of the control thermostat to the control means.

One method of electrically connecting the elements thus far described to form a completely operative system is disclosed in Fig. 8. Here the step-by-step control means bears the numerals corresponding to those used in Figs. 6 and 7, but the apparatus is more diagrammatically shown, the limit switches being eliminated for purposes of clearness. The incoming line is indicated by conductors 128 and 129, the former being connected to the heat-responsive element 110. The contact 115 is connected to one terminal of the heater 122 by a conductor 130, the other terminal of the heater being connected to the conductor 129 of the line through a rheostat 131. Similarly, the contact 116 is connected through conductor 132 with one terminal of the heater 123, the other terminal being connected through a rheostat 133 with the conductor 129.

In the system herein shown I utilize a set of relays 135 and 136 respectively connected in series with the windings 74 and 75 across the line conductors 128 and 129. Thus, closing of the relay 135 by energization of a winding 138 thereof will energize the winding 74, while closing of the relay 136 by energization of a winding 139 thereof will energize the winding 75. One terminal of the winding 138 is connected to the contact 115, the other terminal being connected to the line conductor 129. Similarly, the winding 139 is connected between the line conductor 129 and the contact 116.

The operation of the form of the invention shown in Fig. 8 is as follows: A drop in temperature in the room will cause the contact means 117 of the heat-responsive element 110 to engage the contact 115. This completes two circuits, one through the winding 138 of the relay to close this relay and thus energize the winding 74 of the control means, the other circuit being through the heater 122. The amount of current in the latter circuit is determined by the setting of the rheostat 131, but it is clear that this current flow will heat the heat-responsive element 120. This element is so formed that heat applied thereto will tend to move the free end thereof counterclockwise, the element being formed of a bimetallic strip. Such movement is, however, prevented by the pin or stop 125, the result being that the reaction tends to move the other end of the heat-responsive element 120, thus pivoting the block 108 on the shaft 107 in a clockwise direction. Such clockwise movement of the block 108 moves the heat-responsive element 110 so as to break contact with the contact 115 and move the heat-responsive element 110 into a neutral position. At this instant the two circuits previously completed will be broken and the current through the heater 122 will be cut off thus allowing it to cool, and the winding 74 of the control means will be de-energized. This will permit the spring 76 to advance the control means a step to open the damper to a greater degree, thus supplying more heat to the room to correct the condition. Should this amount of heat be insufficient to maintain the heat-responsive element 110 in its neutral position, another impulse will be formed by the contacting and subsequent separation of the contacts 117 and 115. This and succeeding impulses act to open the damper step-by-step until equilibrium is reached.

On the other hand, if the room temperature rises above the desired point, the heat-responsive element 110 will engage the contact 116 which will complete two circuits, one acting to heat the heat-responsive element 121 to return the heat-responsive element 110 to neutral position, and the other acting to energize the winding 75 through the relay 136 until such time as the contacts 116 and 117 are separated through the action of the heater 123. The impulse thus formed will act to close the damper a step.

The rheostats 131 and 133 prove very valuable in regulating the current through their respective heaters, thus controlling the time interval before these heaters cause the heat-responsive element 110 to be moved into neutral position. This permits the impulses to be delivered at an adjustable rate by merely varying the rheostats 131 and 133 either individually or collectively, and also permits the impulses designed to correct one condition being delivered at a rate different from that of the impulses designed to correct the opposite condition. This adjustment can be conveniently used to prevent "hunting" or "over-shooting" of the system, and offers a convenient means of adjusting the system to any particular installation. Thus, the distance between the thermostat and the heat-supply means of the room varies in different installations, and the greater this distance the longer the time interval between impulses should be to prevent "hunting".

It should not be understood, however, that the system shown in Fig. 8 is limited to the damper control shown. Any control means, within the meaning of that term in this specification, can be substituted which operates step-by-step to change the physical conditions or which operates in response to electric impulses delivered thereto. Nor should it be understood that it is necessary to utilize the particular heater system shown for returning the heat-responsive element 110 to its neutral position to complete the impulse. Other heating means can be used, or the heat-responsive element 110 may be moved into this neutral position by the use of other devices such as a dash-pot device for separating the contacts a predetermined time after energization of the dash-pot device, the frequency of the impulses being determined by varying the rate of operation of the dash-pot.

It is often desirable to make the operation of the control thermostat illustrated in Fig. 3 dependent upon the operation of a master thermostat illustrated in Fig. 1. Thus, the master thermostat may be responsive to temperatures in other parts of the building or to the temperature of the outside air. The invention will be described with particular reference to the latter system. In understanding the desirability of the use of such a master thermostat, it is well to keep in mind the well known conclusion in air-conditioning systems that the inside temperature should in some instances vary proportionally with variations in outside temperature. Thus, during summer weather, it is desirable to increase the internal temperature approximately 1½° F. with every change of 5° F. outside temperature, starting with 70° F. as a datum, and regulating the system so that at 70° F. outside temperature the internal temperature will also be 70° F. Through the use of the master thermostat my system can be made to automatically accomplish not only this result, but also the datum temperature and the constant of proportionality between the two temperatures regulated for, may be established at any suitable value without any alteration in fundamental design of the devices.

Referring particularly to Fig. 1, this master thermostat is shown as being enclosed in an enclosing structure 140 preferably formed of a box with a hinged cover and defining a chamber 141 through which air may freely circulate through louvers 142. This thermostat is, in the preferred embodiment, positioned in the outside air so as to be responsive to outside temperatures.

Extending forward from the rear wall of this enclosing structure 140 is a shaft 143 fixed thereto and pivotally mounting a contact member shown as being in the form of a quadrant 144. Pins 145 and 146 on this quadrant form a mounting for springs 147 and 148 which resiliently engage stops 149 and 150 also carried by the quadrant. Contacts 151 and 152 are respectively carried by these springs.

Positioned between the contacts 151 and 152 is a movable contact means 154 mounted on the free end of a heat-responsive element 155 preferably in the form of a bimetallic strip. The other end of this heat-responsive element is fixed to a disc 156 as by brackets 157. This disc 156 is positioned in front of the quadrant 144 and is pivoted on the shaft 143 to move independently of this quadrant. The angular position of this disc 156, and correspondingly the angular position of the heat-responsive element 155 disregarding temperature changes, is controlled by an adjusting means 159 shown as comprising a worm 160 operated by a thumb-screw 161 pivoted in brackets 162. This worm meshes with teeth formed on the disc so that turning the thumb-screw turns the disc and adjusts the position of the heat-responsive element 155 relative to the quadrant 144. Indicia 163 may be utilized on the disc 156, a pointer 164 indicating the temperature datum at which the master thermostat is set.

In the preferred embodiment of the invention I provide means for shifting the quadrant and the contacts carried thereby when the heat-responsive element 155 moves its contact means 154 into engagement with either of the contacts 151 or 152, this action causing the heat-responsive element 155 to assume a neutral position between these contacts 151 and 152. This means will now be described.

The step-by-step advancing means for the quadrant 144 may conveniently include two sets of ratchet teeth 169 and 170 formed on the upper face thereof. Positioned adjacent the latter set of ratchet teeth is a core 171 around which is a winding 172 acting to magnetize this core and attract an armature 173. This armature is pivoted on a pin 174 carried between arms 175 secured to the core 171, one of these arms providing a stop 176 against which the armature is normally drawn through the action of a tension spring 177. This structure can best be understood by reference to the enlarged detailed view shown in Fig. 2.

The armature 173 carries a pin 178 pivoting a pawl 179 normally resting against a stop 180 and being held thereagainst either by gravitational force or by a suitable spring not shown. In Fig. 2 the full-line position of the armature 173 is an intermediate position, the advanced position being illustrated by dotted lines 181 and the retracted position being shown by dotted lines 182. When moving into the latter dotted-line position, the pawl 179 slips over one of the ratchet teeth as indicated, but when moving into the advanced dotted-line position 181 the pawl engages this ratchet tooth so that the spring 177 advances the quadrant one step. It will be noted that the pawl clears the ratchet teeth when the armature is in its advanced dotted-line position 181.

To insure that the quadrant moves through exactly the desired angular position, I provide a follower 184 in the form of a roller mounted on the free end of a spring 185 and engaging spacer teeth 186 formed on the lower portion of the quadrant 144, these teeth being spaced an angular distance equal to the angular spacing of the ratchet teeth. The spring 185 is mounted in a pin 187 extending forward from the rear wall of the enclosing structure. It will thus be clear that the quadrant 144 can move through a desired number of angular positions.

To move the quadrant 144 in a clockwise direction, I provide an advancing means of similar construction including a core 190, an armature 191, and a spring 192 for advancing this armature when a winding 193 of the core 190 is de-energized. In this event the pawl carried by the armature 191 cooperates with the set of ratchet teeth 169.

It is desirable that this step-by-step movement of the quadrant 144 set up, or otherwise control, a series of impulses which are used in controlling the control thermostat shown in Fig. 3. In the preferred embodiment the impulses are generated by a switch means in the form of impulse switches 198 and 199, shown in Figs. 1 and 2, these switches being actuated by the movement of the armatures 173 and 191.

Referring particularly to Fig. 2, the impulse switch 198 includes a switch arm 200 pivoted on the pin 174 and movable from an advanced position indicated by the dotted lines 201 into a retracted position indicated by full lines. This movement takes place when the armature 173 moves from its advanced dotted-line position 181 into its retracted dotted-line position 182. In accomplishing this movement I prefer to utilize a toggle mechanism, illustrated as comprising a tension spring 203 stretched between pins 204 and 205 respectively mounted on the armature 173 and the switch arm 200. When the armature and switch arm are in the position indicated by dotted lines 181 and 201 respectively, the axis of the spring 203 lies to the left of the axis of the pin 174, thus holding the switch arm in engagement with a contact 207. When the armature has assumed its full-line position, the axis of the spring 203 has moved to the right of the axis of the pin 174, thus moving the switch arm into its full-line retracted position and resiliently holding it in engagement with a stop 209. A reverse movement of the armature will again cause the switch arm to engage the contact 207. This type of toggle mechanism is well known, and no novelty is claimed therefor except as applied to a thermostatic control means. In some instances it is possible to dispense with such a toggle switch, allowing the contacts 151, 152, and 154 to create the electric impulse. The toggle switch is advantageous, however, in providing a quick acting make-and-break system.

The impulse switch 199 is similarly constructed and includes a switch arm 209 making and breaking contact with a contact 210 as the armature 191 is moved. A limit switch 212 is positioned to be opened by movement of the quadrant 144 into an extreme clockwise position, this limit switch including spring contacts 213 and 214 normally in engagement with each other. Similarly, a limit switch 215 is positioned to be opened by a movement of the quadrant 144 into an extreme counterclockwise position, this limit switch including spring contacts 216 and 217 normally in engagement.

The electric impulses thus set up by the master thermostat are, in the preferred embodiment, used in controlling the control thermostat illustrated in Fig. 3. This may be accomplished by mounting the contacts 115 and 116 on a quadrant 225 similar to the quadrant 144 previously described and pivotally mounted on the shaft 107 to the rear of the block 198. The particular mounting of these contacts shown is especially valuable and includes springs 226 and 227 mounted at one end in pins 228 and 229 on the quadrant 225, the free ends of these springs carrying the contacts 115 and 116 and resiliently engaging pins 230 and 231. Thus, any excessive movement of the heat-responsive element 110 after engagement with the contacts 115 or 116 will merely move the springs 226 or 227 sidewise from the pins 230 or 231 thus preventing any undue stresses.

The upper portion of the quadrant 225 is formed similarly to the quadrant 144 previously described, and provides sets of ratchet teeth 234 and 235. Step-by-step advancing means are utilized for changing the position of the quadrant 225, these means being identical with those shown in Fig. 1 as applied to the master thermostat with the exception that the switch means is omitted. Thus, an armature 237 is positioned to be attracted by a core 238 around which a winding 239 is positioned. Such movement of the armature 237 takes place against the action of a spring 240, as previously described, and the armature carries a pawl structure which slips over the ratchet teeth when the armature is attracted by the core 238.

but engages these ratchet teeth in a manner previously described when the armature is moved into advancing position under the action of the spring 240. Energization of the winding 239 is controlled by the master thermostat as will be hereinafter described, so that each electric impulse delivered to the winding 239 acts to shift the quadrant 225 one step in a counterclockwise direction.

Similarly, a step-by-step advancing means is provided for the set of ratchet teeth 234. This advancing means is shown as comprising an armature 244 positioned to be attracted by a core 245 when a winding 246 is energized, this armature moving against the action of a spring 247 and carrying a pawl such as previously described.

Thus, when the master thermostat sends an electric impulse to the winding 246, the quadrant 225 is advanced a step in a counterclockwise direction.

The effect of shifting the quadrant 225 is to change the datum of the control thermostat. This is accomplished by simultaneously shifting the position of the contacts 115 and 116 with respect to the heat-responsive element 110.

To insure that the quadrant 225 moves through exactly the desired angular movement, I provide the control thermostat with a system similar to that shown with respect to the master thermostat. Thus, the lower portion of the quadrant 225 is notched to form teeth 250 engaged by a roller 251 mounted on a spring 252. It is preferable to somehow indicate the datum temperature to which the control thermostat is set at any particular instant of time. This may very conveniently be accomplished by providing indicia 253 on the quadrant 225 and indicating this temperature, the roller 251 cooperating with these indicia to provide an indicating means. The cover of the box 101 may be opened to allow inspection of this indicating means, or this cover may be provided with a suitable opening through which the indicating means may be viewed. It is within the scope of this invention to provide other types of indicating means of this capacity, the particular form shown being merely illustrative.

The preferred mode of electrically connecting the apparatus heretofore set forth in detail will now be described with particular reference to Fig. 10. Both the control thermostat and the master thermostat are there shown, and the two types of control means previously described are shown, one controlling the valve 12, the other controlling the damper 61.

The incoming line is illustrated as comprising conductors 270 and 271. The conductor 270 is connected to the bimetallic strip 155 through a conductor 273, a manual control switch 274, a manual control switch 275, a master switch 276, and a conductor 277. As shown, the manual control switch 274 comprises spring contacts 280 and 281, the latter being connected to the conductor 273, these spring contacts being normally closed as shown, and being opened when the switch is manually depressed. Such a depression of the switch brings spring contacts 282 and 283 into engagement. Similarly, the manual control switch 275 includes spring contacts 285 and 286 normally in contact with each other but separating when the switch is manually depressed. Such depression of this switch brings into engagement spring contacts 287 and 288. The spring contacts 280 and 285 are in electrical connection so that the current flows successively through the switches 274, 275, and 276.

The contact 151 of the master thermostat is connected through the limit switch 212 to the contact 210 of the impulse switch 199 by a conductor 290. The switch arm 209 is connected through the winding 193 of the step-by-step advancing means to the line conductor 271 through conductors 291 and 292. Similarly, the contact 152 is connected through the limit switch 215 and through a conductor 293 to the contact 207 of the impulse switch 198 on the master thermostat. The switch arm 208 corresponding thereto is connected through the winding 172 and the conductor 292 to the line conductor 271 to complete the circuit.

Current flowing through the limit switch 212 of the master thermostat can also return to the line conductor 271 through a conductor means 295 connected to the winding 246 of the control thermostat, and thence through a conductor 296 to the line conductor 271. The conductor means 295 is also connected by a conductor 297 to the spring contact 283 of the manual control switch 274. Similarly, the current flowing through the limit switch 215 may also return to the line through a conductor 298 connected to the winding 239 of the control thermostat, the current then flowing through the conductor 296 to the line conductor 271. The conductor 298 is connected through a conductor 299 with the spring contact 288 of the manual control switch 275.

As shown, I prefer to utilize relays 300 and 301, each providing a winding which, when energized, closes the contacts of these relays. The control current for these relays flows from the line conductor 270 to the heat-responsive element 110 through a conductor 303 and thence, for instance, to the contact 116 which is electrically connected by a conductor 304 to one terminal of the winding of the relay 300. The other terminal of this winding is connected to the rheostat 133 through a conductor 305 and to a conductor 306 which carries the current to the spring contact 55 of the limit switch 51, the current then flowing through the spring contact 56 and through a return conductor 307 which is in turn connected to the line conductor 271. This conductor 307 is also connected to the spring contact 47 of the limit switches 44 and 45, to the spring contact 82 of the limit switches 79 and 80, and to the spring contact 90 of the limit switch 86. Should the heat-responsive element 110 move the contact 115 and contact means 117 into engagement, current will flow through a conductor 310 to one terminal of the winding of the relay 301, the other terminal being connected through a conductor 311 to the rheostat 131. Current will also flow from this terminal of the winding of the relay 301 through a conductor 312 to the spring contact 91 of the limit switch 86. The current flows through this limit switch and thence through the return conductor 307, previously mentioned, to return to the line conductor 271.

The contact 116 of the control thermostat is also connected to the heating coil 123 by a conductor 314, this heating coil being connected in turn to the rheostat 133 through a conductor 315. Similarly, the contact 115 is connected through a conductor 316 to the heater 122 and thence to the rheostat 131 through a conductor 317.

The current operating the step-by-step control means is taken from the line conductor 270 through a conductor 320 which is electrically connected to corresponding contacts of the relays 300 and 301. The remaining contact of the relay 300 is connected by a conductor 321 to both the windings 50 and 75 of the two control means. The remaining terminal of the winding 50 is connected by a conductor 323 to the spring contact 53 of the limit switch 52, and the contact 54 of this limit switch is connected by a conductor 325 to the spring contact 81 of the limit switch 79. Similarly, the remaining terminal of the winding 75 is connected by a conductor 326 to the spring contact 83 of the limit switch 80.

The remaining contact of the relay 301 is connected by a conductor 330 to both the winding 30 and the winding 74 of the two control means. The remaining terminal of the winding 30 is connected by a conductor 331 to the spring contact 48 of the limit switch 45. The remaining terminal of the winding 74 is connected by a conductor 333 to the spring contact 87 of the limit switch 85. The spring contact 88 of this limit switch is connected by a conductor 334 to the spring contact 46 of the limit switch 44.

The system disclosed in Fig. 10 is adapted to automatically open both the valve 12 and the damper 61 when the heat-supply means is shut down, as will be hereinafter explained. Considering that the valve 12 and the damper 61 are completely open, as they would be on a cool morning after no heat control had been effected during the night, it will be clear from the previous description that the limit switch 45 will be open, and the limit switches 44, 51, and 52 will be closed. Similarly, the limit switches 79, 85, and 86 will be open, while the limit switch 80 will be closed. At this time the contact means 117 of the heat-responsive element 110 will be in engagement with the contact 115, and the control thermostat will thus be in a position to call for more heat, but due to the action of the limit switches no current will flow.

In this condition the heating system is turned on and heat flows to the room or building, both the valve 12 and the damper 61 being completely open to allow for quick heating. When a predetermined temperature has been reached the heat-responsive element 110 will move the contact means 117 into engagement with the contact 116. This will do two things. In the first place, it will close a circuit from the supply-line conductor 270 through the conductor 303, the heat-responsive element 110, the conductor 314, the heater 123, the rheostat 133, the conductors 305 and 306, the limit switch 51 (which is at this time closed) and through the return conductor 307 to line 271. As previously set forth, this will heat the element 121 in such a manner that the heating thereof will separate the contacts 116 and 117 after a short interval of time, thus completing the electric impulse. In the second place, engagement and disengagement of the contacts 116 and 117 closes and opens the impulse-carrying circuit, the current flowing from the line through the conductor 303 and the heat-responsive element 110, as previously described, then flowing through the conductor 304, the winding of the relay 300, and thence returning to the line through the conductor 306, the limit switch 51, and the return conductor 307, as previously described. As soon as the contacts 116 and 117 separate, the winding of the relay 300 is de-energized and the circuit through the contacts thereof is broken.

During the time that the relay 300 is closed, current flows from the line through the conductor 320, the contacts of the relay 300, and through the conductor 321. Current cannot flow through the winding 50 at this time, for while the limit switch 52 is closed, thus supplying current to the conductor 325, the limit switch 79 is open. The current can, however, flow from the conductor 321 through the winding 75, and thence through the conductor 326, the limit switch 80 (now closed), and thence through the return conductor 307 to line. As soon as the relay 300 breaks the circuit, however, this flow of current stops and the result is that an electric impulse has been delivered to the winding 75, which impulse closes the damper 61 one step.

Only a slight amount of heat need be developed by the heating coil 123 to separate the contacts 116 and 117. Furthermore, the current flows through this heater only during the time that these contacts are in engagement. The result is that as soon as these contacts move from engagement, the heat-responsive element 121 cools. This cooling, together with any slight additional clockwise movement of the heat-responsive element 110 due to any excessive heat, will again bring the contacts 116 and 117 into engagement with each other, thus again completing the circuits previously traced. This action continues, and the damper 61 is thus closed step-by-step as the electric impulses are delivered to the winding 75.

During this closing movement of the damper 61, it is clear that the position of the limit switches of this control means will change. Thus, while the limit switch 79 will remain open and the limit switch 80 will remain closed, the limit switches 85 and 86 will return to closed position as soon as the damper 61 starts to close. This will, however, have no effect on the circuits previously traced.

When the damper 61 has reached a desired closed position, the limit switch 79 closes and the limit switch 80 immediately opens. The result is that subsequent engagement and disengagement of the contacts 116 and 117 will transfer the impulses from the control thermostat to the winding 50 rather than through the winding 75, current through the latter winding being interrupted by the opening of the limit switch 80, and current through the former winding now flowing from the conductor 321 through the winding 50, the conductor 323, the limit switch 52 (now closed), the conductor 325, the limit switch 79 (now closed), and returning to the line through the return conductor 307. Thus, each subsequent impulse will close the valve 12 one step. The closing of the limit switch 45 and the opening of the limit switch 44 when the valve 12 first starts to close does not affect the circuits energizing the windings 50 and 75.

This successive closing action of the damper 61 and the valve 12 in some instances may continue until both valves are completely closed. It will be understood that this condition may seldom, if ever, be reached, for a condition of equilibrium will usually have been reached in the meantime, and the heat-responsive element 110 will float between the contacts 115 and 116. However, if the valve 12 should become completely closed the nut 22 will rise, as previously described, thus opening the limit switches 52 and 51. The opening of the limit switch 52 will prevent the impulses from subsequently flowing through the winding 50, while the opening of the limit switch 51 will prevent current from flowing through the heater 123 and the relay 300. Thus, no current would flow in the system until such time as the control thermostat calls for more heat.

When the room is cooled below the predetermined temperature, the control thermostat will call for more heat by moving the contacts 115 and 117 into engagement. This will have two effects, as previously described. The first effect will be to close the circuit through the heater 122 until such time as this heater separates the contacts 115 and 117. The second effect is to energize the relay 301 during the time that the contacts 115 and 117 are in engagement, and deenergize this relay when the contacts separate.

During the time that the relay 301 is energized, current flows from the line through the conductor 328, the contacts of the relay 301, and through the conductor 330. Current is thus delivered to both the windings 30 and 74, but the current cannot flow through the latter winding for, while the limit switch 85 is closed, thus tending to send current through the conductor 334, the limit switch 44 is open. Current can, however, flow from the conductor 330 through the winding 30, the conductor 331, and through the limit switch 45, returning to the line through the return conductor 307. When the relay 301 is deenergized this circuit is broken. The result is that an impulse is delivered to the winding 30 which opens the valve 12 one step. If the system has not reached an equilibrium, this action will be repeated, it being clear that each time the contacts 115 117 engage and disengage an electric impulse is delivered which opens the valve 12 one step. When the valve 12 starts to open the limit switches 51 and 52 close. This does not, however, affect the circuits through the windings 30 and 74.

Should this action continue until the valve 12 is completely open, it will be clear that the limit switch 44 will be closed and the limit switch 45 will be opened. This will transfer the impulses from the winding 30 to the winding 74, for impulse current can no longer flow through the winding 30 due to the opening of the limit switch 45. However, current can flow through the winding 74, the conductor 333, the limit switch 85, the conductor 334, the limit switch 44, and thence to line through the return conductor 307. Thus, if the control thermostat should continuously deliver impulses, the result will be that the valve 12 will be first opened and subsequently the damper 61 will be opened step-by-step. Such a condition will exist, for instance, when the heating system is turned off at the end of the day, it being clear that the control thermostat will continuously call for more heat, thus resulting in the successive opening of the valve 12 and the damper. When the damper 61 reaches its open position the limit switches 85 and 86 will be opened. The opening of the limit switch 85 breaks the heretofore complete circuit through the winding 74 thus preventing subsequent energization thereof, while the opening of the limit switch 86 opens the circuit through the heater 122 and the relay 301. The result is that the heat responsive element 110 is not moved from engagement with the contact 115, yet no current flows through the circuit at this time. As soon as the heat is turned on in the morning, the action previously described automatically takes place.

The above detailed description has been set forth without reference to the action of the master thermostat. It will be clear, however, that the outside temperature may change throughout the day, thus making it desirable to change the inside temperature as previously set forth, especially if the valve 12 and damper 61 now control the cooling of the room. This can, of course, be accomplished by shifting the contacts 115 and 116 as a unit, thus changing the relative positions of these contacts and the contact means 117 carried by the heat-responsive element 110. The operation of this portion of the circuit will now be described.

Assuming that the master switch 276 is closed and the manual control switches 274 and 275 are in the position shown in Fig. 10, current can flow from the line conductor 270 through the conductor 273, the spring contacts 281, 280, 286, and 285, the master switch 276 and the conductor 277, the current thus reaching the heat-responsive element 155 of the master thermostat. Assuming that the exterior temperature has increased, the heat-responsive element 155 will move in a clockwise direction to bring the contact means 154 into engagement with the contact 151. This completes two circuits. The first circuit extends from the contact 151 through the limit switch 212, the conductor 290, the contacts 210 and 209 (at this time closed) the winding 193, and the conductors 291 and 292 to line. This will energize the winding 193 and attract the armature 191 against the action of its associated spring 192. The toggle mechanism will throw the switch arm 209 from contact with the contact 210, as previously set forth, thus opening the switch means 199 and breaking the circuit through the winding 193 and allowing the spring 192 to advance the quadrant 144 one step in a clockwise direction. This will, of course, shift the contact 151 from engagement with the contact means 154 so that the heat-responsive element 155 assumes an intermediate position. This will break the circuit previously formed between the heat-responsive element 155 and the contact 151.

In the second place, it will be clear that the engagement and disengagement of the contacts 154 and 151 will close a second circuit and send an electric impulse through a circuit including the limit switch 212, the conductor 295, the winding 246 of the control thermostat, the current returning to the line through the conductor 296. During the time that this circuit is energized, the winding 246 will attract the armature 244 against the action of its associated spring 247. As soon as the circuit is broken due to the shifting of the quadrant of the master thermostat to separate the contacts 151 and 154, the winding 246 will be deenergized and the spring 247 will move the quadrant 225 of the control thermostat one step in a clockwise direction. This will, of course, shift the datum of the control thermostat by moving the contact 115 toward the contact means 117 and by moving the contact 116 away from the contact means 117. It will thus require more heat to move the heat-responsive element into a position where it engages the contact 116 than was the case theretofore. The result is that the datum temperature will be increased by an amount determined by the shift in position of the quadrant 225.

Similarly, if the temperature of the exterior air becomes lower, the heat-responsive element 155 will move the contact means 154 into engagement with the contact 152. This will complete a circuit similar to that previously described and including the limit switch 215, the conductor 293, the contact 207, the switch arm 200, the winding 172, and the conductor 292. This will energize the winding 172 and attract the armature 173, thus separating the switch arm 200 and the contact 207 to open the switch means 198 and thus breaking the circuit through the winding 172, so that the spring 177 will move the armature into an advanced position and thus move the quadrant 144 one step in a counterclockwise direction. This will separate the contacts 152 and 154 and thus break a circuit which previously was completed therethrough and which circuit included the limit switch 215, the conductor 298, the winding 239 of the control thermostat, and the conductor 296. This action will energize and de-energize the winding 239, as previously described, thus moving the quadrant 225 one step in a counterclockwise direction to shift the contacts 115 and 116 in a direction opposite to that previously described.

Should the quadrant 144 assume such a position as to open either the limit switch 212 or 215, it will be clear that no current can flow through either the impulse circuits including the windings 172 and 193 or through the impulse circuits including the windings 239 and 246.

Should it be desired to change the relationship between the master thermostat and the control thermostat, either to increase or decrease the internal temperature with respect to the external temperature, this can be accomplished by actuation of the manual control switches. Thus, momentarily depressing the manual control switch 274 will send current from the line through the conductor 273, the spring contacts 282 and 283, the conductors 297 and 295, the winding 246 and the conductor 296. This will momentarily energize and de-energize the winding 246 to turn the quadrant 225 one step in a clockwise direction, as previously described. This actuation of the manual control switch 274 will not affect the master thermostat, for the main circuit is broken when the spring contacts 280 and 281 are moved from engagement with each other, this disengagement taking place before engagement between the spring contacts 282 and 283.

Similarly, momentarily depressing the manual control switch 275 will send current from the line through the conductor 273, the spring contacts 287 and 288, the conductors 299 and 298, the winding 239, and the conductor 296. This will send an impulse to the winding 239 and will thus turn the quadrant 225 a step in a counterclockwise direction. Movement of this manual control switch will not, however, change the master thermostat in view of the fact that the contacts 285 and 286 separate to break the main circuit to the master thermostat before the spring contacts 287 and 288 come into engagement.

It is often desirable for the operator to know the relationship between the master thermostat and the control thermostat at any particular instant of time so that he can ascertain whether or not to change this relationship through actuation of the manual control switches 274 and 275. Such an indication can be given by an indicating means 400 including a rotatable pointer 401. This pointer may be controlled by a step-by-step mechanism very similar to that described with relation to the quadrant 225, the pointer indicating the position of this quadrant. Thus, one of the windings controlling the step-by-step operation of this quadrant would be connected by a conductor 402 to the conductor 299, while the other winding would be connected by a conductor 403 to the conductor 297, these windings having a common return conductor 404 connected to line. Thus, the pointer will move one step in a clockwise direction each time the quadrant 225 is moved a step in a clockwise direction, whether such motion of the quadrant 225 is due to an impulse from the master thermostat or is due to manual operation of the control switch 274. Similarly, when the manual control switch 275 is momentarily depressed or the master thermostat operates to advance the quadrant 225 in a counterclockwise direction, the pointer 401 will be moved one step in a counterclockwise direction. This telemetric system is very desirable in this form of apparatus.

It will thus be clear that the formation of electric impulses can take place either by moving the heat-responsive element or by moving the contacts with respect thereto. The system shown in Fig. 10 includes both types, while the system shown in Fig. 8 relates only to the former type. In many instances it is possible to utilize the latter type in conjunction with one or more control means, and in this connection the master thermostat can be directly connected thereto and made responsive to the temperature to be controlled. Such an installation is disclosed in Fig. 9 and will now be described.

Referring particularly to Fig. 9, I have illustrated a supply line composed of conductors 420 and 421 with the master thermostat positioned to be responsive to room temperature. In this instance it will be clear that if the temperature of the room decreases, the heat-responsive element 155 will move counterclockwise to engage the contact 152. This will complete two circuits. One circuit includes a conductor 420a, the heat-responsive element 155, the contact 152, the limit switch 215, a conductor 422, the impulse switch 198, the winding 172, and a conductor 425. Energization of this circuit acts, as previously described, to shift the quadrant 144 a step in a counterclockwise direction so as to position the contact means 154 intermediate the contacts 151 and 152. The separation of the contact 152 and the contact means 154 breaks a circuit previously formed through the conductor 420a, the heat-responsive element 155, the contact 152, the limit switch 215, a conductor 426, the winding of a relay 428 and a conductor 429. The relay 428 is thus energized and de-energized when the contacts 154 and 152 engage and disengage.

The system of limit switches shown in Fig. 9 is slightly different from that heretofore described. Thus, the valve 12 has limit switches 432 and 433. When this valve is in extreme open position, the limit switch 432 is closed and the limit switch 433 is open, but when the valve is in a partially open position, the limit switch 432 is open and the limit switch 433 is closed, as shown. Similarly, this valve includes a limit switch 434 which opens only when the valve is completely closed, in a manner previously described. The damper control system provides limit switches 436 and 437. When the damper is completely closed the limit switch 437 is open and the limit switch 436 is closed. So also, this damper control system provides a limit switch 438 which opens only when the damper 61 is completely open.

Considering that the damper 61 is closed and the valve 12 is partially open, energization of the relay 428 will complete a circuit through the conductor 429, the limit switch 433, and the winding 30. When the relay 428 is deenergized this circuit breaks with the result that the valve 12 is opened a step. Should this valve completely open, and the master thermostat still call for more heat, the electric impulses will be transferred through the limit switch 432 (now closed), and thence through the limit switch 438 and the winding 74. These impulses will open the damper 61 a step, as previously described. If equilibrium is not yet attained, the damper 61 will open step-by-step, as previously described, until the limit switch 438 opens, at which time no current will flow through the system, and the heating means will be supplying a maximum amount of heat to the room.

On the other hand, if the temperature of the room is too high the heat-responsive element 155 will move the contact means 154 into engagement with the contact 151. This will complete two circuits, one through the limit switch 212, the impulse switch 199, and the winding 193, the completion of this circuit acting to shift the quadrant 144 a step in a clockwise direction to again disengage the contact 151 and the contact means 154. The second circuit includes the limit switch 212 and a winding of a relay 450, the current returning to the line through the conductor 429. Each time the relay 450 closes, an impulse is sent to one of the control means. If both control means are open, the electric impulses will be delivered through the limit switch 437 and the winding 75, thus closing the damper 61 step-by-step. As soon as this damper is completely closed the limit switch 437 will be opened and the limit switch 436 will be closed, thus transferring these electric impulses through the limit switch 436 and the limit switch 434 to the winding 50. Each energization of the winding 50 will close the valve 12 a step, as previously described. Should the valve 12 become completely closed the limit switch 434 will open so that no current is consumed by the system.

In conclusion, it will be clear that my invention is not limited to two control means successively actuated, though the embodiment shown in Figs. 9 and 10 includes such a dual control. Thus, a single control means can be used. The advantage of a cascade operation of two control means is, of course, that one control means opens only after the other has reached an extreme position. When both are in extreme positions, the system is still in condition to operate in a reverse direction. In the particular embodiment shown one control means will open step-by-step, followed by the other, and the system will reverse first through this other control means and then through the first control means. This system is very desirable in many instances. Any number of control means can be utilized in cascade by utilization of the process herein disclosed. Further, while I have disclosed an electrical system for transferring from one control means to the other, other interconnecting systems of a mechanical nature may be used.

The system shown in Fig. 9 wherein the master thermostat is directly connected to the control means is particularly desirable in view of the fact that in some installations there is less "hunting" of the thermostat, the wiring of such a system being also relatively simple. It is with such a system, however, necessary in some instances to more accurately control the source of heat in view of the fact that a given opening of the valve or damper should preferably give the same heating effect at all times.

In utilizing the system shown in Fig. 8 wherein the control thermostat is directly connected to the control means, the system may have more of a tendency to "hunt." This, however, can be readily compensated for by proper adjustment of the rheostats 131 and 133, it being clear that the setting of these rheostats will control the rate of heating of the heaters and thus the time between impulses. The setting of these rheostats will depend upon numerous factors including the distance between the thermostat and the position at which heat is introduced into the room. This particular system is very advantageous in view of the fact that it compensates for changes in effectiveness of the heat sources. Thus, regardless of variations in the heat source, the position of the valve 12 and damper 61 will compensate for such variations.

Another very important feature of the invention is that when the control means are either completely open or completely closed no current flows through the system. Further, the circuits carry no current except during the sending of the electric impulses therethrough. Thus, the current consumption is almost negligible as distinguished from other electrical systems which necessitate the continuous flow of current at all times.

While I have particularly described the system shown in Fig. 10 with reference to a system wherein the master thermostat is responsive to external temperature and the control thermostat responsive to internal temperature, this combination is not essential to the invention. The master thermostat can be positioned in any desired place. Thus, if the temperature of one room is to be controlled as a function of the temperature of another, one thermostat can be positioned in one room and the other in another, thus effecting this result.

While I have particularly described the invention with reference to a heat control system, it should be clear that the invention is not limited thereto. Thus, the term "thermostatic control" has not been used with regard only to a system wherein temperature conditions alone are changed, but includes any conditioning system or control system changing the physical properties of a medium in response to temperature variations.

Nor need the system be responsive only to dry bulb temperatures, for one or both thermostatic means may be of the wet bulb type. It is well-known, for instance, that relative humidity can be determined by comparison of wet bulb and dry bulb thermometers. By making one of my thermostat means responsive to wet bulb and the other responsive to dry bulb temperatures, they can be made jointly responsive to relative humidity by suitably proportioning their respective ratchet mechanism. Such a system would permit the control of the relative humidity of the room or building. In such an installation both the thermostat means are preferably positioned in the same room.

As previously mentioned, various heating, cooling, or conditioning devices may be operated by my step-by-step system. Thus, any type of throttling device can be directly or indirectly controlled by the system. Such, for instance, as a steam valve, water valve, etc., or an air damper. Similarly, the step-by-step control herein disclosed can be applied to the control of cold brine or refrigerant, or can be made to control the setting of an electric rheostat to vary the current therethrough and thus vary either directly or indirectly the control of the heating of a room or building. It may also be applied to devices controlling the speed of fans or other mechanical or electrical devices, and may be used in controlling the amount of moisture delivered to a room or building by an air-conditioning system. Other possibilities too numerous to mention will be apparent to those skilled in the art.

Finally, it will be clear that my system is not limited to thermostatic means which act to generate the electric impulses, for the system will work just as well if electric impulses are delivered through the incoming line or are generated in the line between the thermostat and the control means, the thermostatic means in this instance controlling the delivery of the impulses to the control means and thus changing the setting thereof, as previously mentioned.

I claim as my invention:

1. In combination in a system for controlling the physical conditions of a medium: a control means capable of changing said conditions; a ratchet means operatively connected to said control means to move same step-by-step in finite predetermined increments; impulse-actuated means for moving said ratchet means in response to electric impulses delivered thereto, said impulse-actuated means transforming said electric impulses into mechanical impulses of sufficient strength to move said ratchet means and the associated control means one step for each electric impulse; transmission means for transmitting electrical impulses to said impulse-actuated means to move said control means step-by-step; and means for controlling said impulses transmitted to said impulse-actuated means, said means including an impulse-generating thermostatic means responsive to said physical conditions of said medium.

2. In combination in a system for controlling the physical conditions of a medium: an element moving in response to the physical condition of said medium; a pair of contacts adapted to be brought into engagement by movement of said element to close an electric circuit therethrough to start an electric impulse; means operated by the current flowing through said circuit and operatively connected to at least one of said contacts for separating said contacts to complete an electric impulse; a control means for changing said physical condition of said medium; electrically-actuated means for advancing said control means step-by-step synchronously with electric impulses delivered thereto; and transmission means for delivering to said electrically-actuated means said electric impulse formed by the closing and subsequent opening of said contacts.

3. In combination in a system for controlling the physical conditions of a medium such as air: impulse means generating an electric impulse only when said physical conditions need changing for setting up a series of electric impulses at a frequency controlled by the rate of change of the existing conditions of said medium, said means including an element responsive to the conditions of said medium and including a pair of contacts which close to start an electric impulse and open to complete this electric impulse; a step-by-step control means capable of changing said conditions of said medium; and means interconnecting said impulse means and said control means to move said control means a step each time an electric impulse is delivered thereto by said interconnecting means.

4. In combination in a system for controlling the physical conditions of a medium: a control means capable of changing said conditions; impulse-actuated means for operating said control means step-by-step in response to electric impulses delivered thereto; transmission means for delivering electric impulses to said impulse-actuated means; and an impulse-generating means connected to said transmission means and operating in response to said physical condition of said medium to generate impulses in response to a change of said physical condition, said impulse-generating means including a member movable in response to said condition, a movable element, two spaced contacts mounted on said movable element, contact means in the space between said two contacts and movable to engage either of said two spaced contacts in response to movement of said member thereby starting an electric impulse, and means mechanically independent of said impulse-actuated means for automatically moving said movable element sufficiently to separate said contact means and that one of said spaced contacts engaging therewith to complete said electric impulse.

5. In combination in a system for changing the physical conditions of a medium: a control means capable of changing said conditions; a movable member; a pair of contacts spaced from each other on said movable member; contact means movable in the space between said contacts; means responsive to said physical conditions for moving said contact means to bring said contact means and one of said contacts into engagement to close a circuit to start an electric impulse therethrough; electrically-controlled means forming a first means associated with said circuit for moving said movable member step-by-step, each step being of such extent as to move said movable means from a position in which said contact means engages said contact into a position in which said contact means is positioned between said two contacts, thus breaking said circuit to complete said electric impulse and thus preventing re-actuation of said electrically-controlled means until said contact means again comes into engagement with one of said contacts; and a second means associated with said circuit and controlled by the electric impulses set up therein, said second means including an actuating means responsive to said electric impulses and moving said control means step-by-step in step with said impulses.

6. In combination in a system for controlling the physical conditions of a medium: a control means capable of changing said conditions; electrically-actuated means for controlling said control means step-by-step; transmission means for transmitting electrical impulses to said electrically-actuated means; and means for controlling said impulses transmitted to said electrically-actuated means, said means including a thermostatic means which in turn includes a heat-responsive element movable in response to changes in said physical conditions, a pair of contacts movable into engagement with each other by said heat-responsive element, an electric circuit including said contacts, a second heat-responsive means operatively connected to one of said contacts to separate said contacts when the temperature of said second heat-responsive means is changed, and a heating means in said electric circuit changing the temperature of said second heat-responsive means to separate said contacts shortly after they come into engagement.

7. In combination in a system for controlling the physical conditions of a medium: an element moving in response to the physical condition of said medium; a pair of contacts adapted to be brought into engagement by movement of said element to close an electric circuit therethrough to start an electric impulse; a heat-responsive element operatively connected to one of said contacts to move same away from the other of said contacts upon change of temperature of this heat-responsive element; means associated with said circuit to change the temperature of said last named heat-responsive element when said circuit closes, thereby opening said circuit to complete said electric impulse; a control means for changing said physical condition of said medium; electrically-actuated means for advancing said control means step-by-step synchronously with electric impulses delivered thereto; and transmission means for delivering to said electrically-actuated means said electric impulse formed by the closing and subsequent opening of said contacts.

8. A thermostatic system including in combination: a first heat-responsive element movable in response to changes in temperature of the medium to be controlled; a pair of contacts movable into engagement by the movement of said heat-responsive element; a second heat-responsive element operatively connected to said first heat-responsive element to move same in a direction to separate said contacts when the temperature of said second heat-responsive element is changed; means for changing the heat conditions of each of said heat-responsive elements; and means operatively connecting said last-named means and said contacts whereby said heat conditions affecting said heat-responsive elements are controlled by the closing and opening of said contacts.

9. In combination in a system for changing the temperature of a medium: a first heat-responsive element movable in response to the temperature of said medium; a pair of contacts movable into engagement with each other by said heat-responsive element to close a circuit to start an electric impulse; a second heat-responsive element operatively connected to said first heat-responsive element to move same in a direction to separate said contacts; heating means electrically connected to said circuit to change the temperature of said second heat-responsive element, thereby moving said first heat-responsive element to separate said contacts thereby breaking said circuit to complete an electric impulse; a control means for changing the temperature of said medium; electrically-actuated means for advancing said control means step-by-step synchronously with electric impulses delivered thereto; and transmission means for delivering to said electrically-actuated means said electric impulse formed by the closing and subsequent opening of said contacts.

10. A combination as defined in claim 2 in which element is a heat-responsive element and in which said element said pair of contacts closing to start said impulse and said means for separating said contacts comprise a control thermostat which generates impulses in response to the temperature variations affecting same, and including means responsive to temperature conditions at a position spaced from said heat-responsive element and controlling the generation of said impulses by said control thermostat, said last-named means including a master thermostat operatively connected to said control thermostat to control the generation of said impulses thereby.

11. In a system for correlating room conditions with atmospheric conditions, the combination of: control means capable of changing said room conditions; means for actuating said control means step-by-step in step with electric impulses delivered thereto; impulse means responsible to the conditions in said room for sending electric impulses to said means for actuating said control means; means responsive to atmospheric conditions outside said room; and interconnecting means operatively connecting said last named means and said impulse means to control said impulses as a function of said atmospheric conditions outside the room.

12. In combination in a system for controlling the physical conditions of a medium: a control means capable of changing said conditions; electrically-operated actuating means for controlling said control means step-by-step; a control thermostat including two contacts, a heat-responsive element, and a contact means movable by said heat-responsive element to engage either of said contacts in response to temperature conditions affecting said control thermostat; transmission means electrically connecting said contacts and said actuating means to transmit electric impulses to said actuating means; a ratchet means for moving said pair of movable contacts relative to said heat-responsive element step-by-step in finite increments; a master thermostat including a heat-responsive element; and means operatively connecting said last-mentioned heat-responsive element and said ratchet means to move said pair of contacts on said control thermostat through pre-determined distances as the ratchet means advances said movable contacts step-by-step.

13. In combination in a system for controlling the physical conditions of a medium: control means capable of changing said physical conditions; advancing ratchet means operatively connected to said control means for advancing same step-by-step synchronously with the movement of said advancing ratchet means; retracting ratchet means operatively connected to said control means for retracting same step-by-step synchronously with the movement of said retracting ratchet means; a pair of electric drive means for moving said advancing and retracting ratchet means with sufficient force to move said control means; means responsive to changes in said physical conditions of said medium for transmitting electric impulses to said pair of electric means thus operating said ratchet means synchronously with said impulses to change the position of said control means, said means including a circuit means through which said electric impulses are transmitted to said pair of electric means; and means associated with said circuit means and with one of said electric drive means for switching said electric impulses from this electric drive means when this electric drive means reaches a predetermined position.

14. In combination in a system for controlling the physical conditions of a medium: a primary control means movable between extreme positions to change the physical conditions of said medium in degree varying with the position of said primary control means; a secondary control means movable between extreme positions to change the physical conditions of said medium in degree varying with the position of said secondary control means; impulse-operated primary and secondary means respectively operating said primary and secondary control means step-by-step, said primary and secondary means including ratchet means respectively operating said control means; means responsive to the physical conditions of said medium for supplying to said primary and secondary means electric impulses controlled by said physical conditions; and means interconnecting said primary and secondary means and preventing operation of said secondary means until said primary means is moved into an extreme position and preventing subsequent operation of said primary means until said secondary means is moved to an extreme position.

15. In a system for correlating room conditions with atmospheric conditions, the combination of: control means capable of changing said room conditions; means for actuating said control means; a first means responsive to said conditions in said room and including two contacts movable into engagement as a function of the said conditions in said room; means movably mounting one of said contacts to move step-by-step in finite increments of predetermined amount; a second means responsive to atmospheric conditions outside said room; and interconnecting means operatively connecting said second means and said means movably mounting said one of said contacts to move said contact step-by-step in said predetermined finite increments in response to said atmospheric conditions outside said room.

16. In combination in a system for controlling the physical conditions of a medium; impulse-producing means including a thermostat responsive to the temperature of said medium, a pair of contacts brought into engagement with each other by operation of said thermostat, and means for opening said contacts shortly after they come into engagement thus producing an electric impulse, said impulses being thus repeated at a rate determined by the rate of change of the temperature of said medium; means associated with said impulse-producing means for varying the frequency of said impulses with a given rate of change of said temperature; and impulse-responsive control means movable step-by-step and operatively connected to said impulse-producing means for changing said physical condition of said medium.

17. A combination as defined in claim 16 in which said means for opening said contacts includes an auxiliary thermostat and a heating means therefor and connected in circuit with said contacts, and in which said means for varying the frequency of said impulses includes a variable impedance in said circuit.

18. In combination in a system for controlling the physical conditions of a medium: a master thermostat including a pair of contacts movable into engagement with each other in response to changes in temperature affecting said master thermostat; means for moving said contacts from engagement with each other; a first circuit connected to said pair of contacts and to said means to operate said means to separate said contacts shortly after they come into engagement; a control thermostat including a heat-responsive element responsive to the temperature of said medium and including a second pair of contacts brought into engagement thereby, one of said second pair of contacts being movably mounted; shifting means for moving said movable contact of said second pair; a second circuit connected to said first-named pair of contacts and connected to said shifting means for moving said movable contact of said second pair; and step-by-step impulse-actuated control means operatively connected to said second pair of contacts and capable of changing said physical condition of said medium.

19. In combination in a system for controlling the physical conditions of a medium: a first step-by-step control means for controlling said condition of said medium; a second step-by-step control means for controlling said medium; electric means for operating each of said control means step-by-step; switch means for rendering one of said control means inoperative when this control means reaches an extreme position and rendering the other control means operative at this time; impulse-delivering thermostatic means responsive to the temperature of said medium and electrically connected to said electric means through said switch means; and limit means associated with said control means and said electric means for de-energizing each of said electric means when said thermostatic means has moved said first and second control means into predetermined limiting positions.

20. In combination in a system for changing the physical conditions of a medium: a control means; a ratchet means; a member driven step-by-step by said ratchet means and operatively connected to said control means for advancing same in finite increments; an electric means associated with said ratchet means and adapted when energized to move said ratchet relative to said member in disengaged relationship therewith; resilient means retarding said movement of said ratchet means which takes place by the energization of said electric means, said resilient means returning said ratchet means in engaged relationship with said member when said electric means is de-energized; and a limit switch changing the spacing of its contacts when said member reaches a predetermined position, said resilient means moving said member into said predetermined position after the last energization of said electric means whereby the change in spacing of said contacts takes place when said ratchet means is moved by said resilient means rather than when moved by said electric means.

21. In combination in a system for controlling the physical conditions of a medium: a control means capable of changing said conditions; impulse-actuated means for controlling said control means step-by-step; transmission means for transmitting impulses to said impulse-actuated means; impulse-generating means operating in response to said physical condition of said medium and generating electric impulses in response to a departure of said condition from a given datum and operatively connected to said transmission means and thus to said impulse-actuated means; and manually controlled impulse means operatively connected to said impulse-generating means for shifting said datum of said impulse-generating means step-by-step.

22. In combination in a system for controlling the physical conditions of a medium: a control means capable of changing said conditions; impulse-actuated means for controlling said control means step-by-step; transmission means for transmitting impulses to said impulse-actuated means; impulse-generating means operating in response to said physical condition of said medium generating electric impulses in response to a departure of said condition from a given datum and operatively connected to said transmission means and thus to said impulse-actuated means; manually controlled impulse means operatively connected to said impulse-generating means for shifting said datum of said impulse-generating means step-by-step; and remotely indicating means operatively connected to both of said impulse-generating means and operating in synchronism with the change in datum of said first-named impulse-generating means.

23. In combination in a system for controlling the physical conditions of a medium: a first step-by-step control means for controlling said condition of said medium; a second step-by-step control means for controlling said medium; electric means for operating each of said control means step-by-step; switch means for rendering one of said control means inoperative when this control means reaches an extreme position and rendering the other control means operative at this time; and impulse-delivering thermostatic means responsive to the temperature of said medium and electrically connected to said electric means through said switch means, said switch means transferring the electric impulses from said one of said control means to the other when said one of said control means reaches an extreme position.

24. In combination in a system for changing the physical conditions of a medium: a control means capable of changing said condition; an impulse-actuated means for moving said control means step-by-step; a heat-responsive element controlled by the temperature of said medium; a contact adapted to be moved by such heat-responsive element; a second contact engageable with said first-named contact; a movable member mounting said second contact; a source of potential associated with said contacts, the engagement of said contacts starting an electric impulse to said actuating means and the separation of said contacts completing this impulse; a ratchet means associated with said movable member to move same in a direction to separate said contact; and means associated with said ratchet means for controlling the movement of said movable member.

25. In combination in a system for controlling the physical conditions of a medium: a control means capable of changing said conditions; electric impulse-actuated means for controlling said control means step-by-step; transmission means for transmitting impulses to said electric impulse-actuated means; and an impulse-generating means operating in response to said physical condition of said medium to generate electric impulses in response to a change of said condition, said impulse-generating means including a member movable in response to a change in said condition, a pair of contacts brought into engagement by a movement of said member and connected to said transmission means, engagement of said contacts starting an impulse, and including means mechanically independent of said impulse-actuated means for separating said contacts to complete said impulse, said impulse being transmitted to said impulse-actuated means through said transmission means.

ALBERT E. BYLER.